(12) United States Patent
Alexander

(10) Patent No.: US 7,839,854 B2
(45) Date of Patent: Nov. 23, 2010

(54) SYSTEM AND METHOD FOR A FAST, PROGRAMMABLE PACKET PROCESSING SYSTEM

(76) Inventor: Thomas Alexander, 796 Maplewood Ave., Palo Alto, CA (US) 94303

( * ) Notice: Subject to any disclaimer, the term of this patent is extended or adjusted under 35 U.S.C. 154(b) by 674 days.

(21) Appl. No.: 11/366,267

(22) Filed: Mar. 2, 2006

(65) Prior Publication Data
US 2006/0242710 A1    Oct. 26, 2006

(51) Int. Cl.
H04L 12/28    (2006.01)

(52) U.S. Cl. .................. 370/392; 370/395.31; 709/242; 345/503

(58) Field of Classification Search ............... 370/252, 370/241, 229–238.1, 350–394, 395.31; 726/22, 726/23, 24; 709/238–244, 250; 345/501–522
See application file for complete search history.

(56) References Cited

U.S. PATENT DOCUMENTS

| | | | |
|---|---|---|---|
| 6,539,369 B2 * | 3/2003 | Brown ........................... 707/1 |
| 6,744,729 B2 | 6/2004 | Tinsley et al. |
| 7,053,901 B2 * | 5/2006 | Huang et al. ................ 345/503 |
| 7,091,982 B2 * | 8/2006 | Hutchins et al. ............ 345/561 |
| 7,383,352 B2 * | 6/2008 | Hicok et al. ................ 709/238 |
| 7,548,892 B2 * | 6/2009 | Buck et al. ..................... 706/12 |
| 2003/0126468 A1 | 7/2003 | Markham |
| 2003/0140179 A1 * | 7/2003 | Wilt et al. .................... 709/321 |
| 2004/0114589 A1 * | 6/2004 | Alfieri et al. ................ 370/389 |
| 2004/0148281 A1 | 7/2004 | Bates et al. |
| 2004/0215770 A1 * | 10/2004 | Maher et al. ................ 709/224 |
| 2005/0240781 A1 * | 10/2005 | Gassoway .................... 713/188 |

OTHER PUBLICATIONS

International Search Report issued Feb. 27, 2007 for PCT application No. PCT/US06/07694 filed Mar. 6, 2007, applicant Alexander.

* cited by examiner

*Primary Examiner*—Aung S Moe
*Assistant Examiner*—Habte Mered
(74) *Attorney, Agent, or Firm*—Sawyer Law Group, P.C.

(57) ABSTRACT

The present invention provides a cost effective method to improve the performance of communication appliances by retargeting the graphics processing unit as a coprocessor to accelerate networking operations. A system and method is disclosed for using a coprocessor on a standard personal computer to accelerate packet processing operations common to network appliances. The appliances include but are not limited to routers, switches, load balancers and Unified Threat Management appliances. More specifically, the method uses common advanced graphics processor engines to accelerate the packet processing tasks.

8 Claims, 6 Drawing Sheets

SYSTEM AND METHOD FOR A FAST, PROGRAMMABLE PACKET PROCESSING SYSTEM

FIELD OF THE INVENTION

The present invention relates generally to networking systems and more specifically to packet processing systems that use graphics systems to process packets.

BACKGROUND OF THE INVENTION

The X86 computer (personal or workstation) is a common data processing platform. Although no specific definition exists for an X86 computer, one skilled in the art of computer design will recognize such a system by its components. The major components include a central processing unit which executes the X86 instruction set. Examples of such processors are the Pentium processors from Intel, Athlon processors from Advanced Micro Devices or PowerPC processors from IBM. DRAM memory is utilized to store the instructions and data, and a set of peripheral components are utilized to provide data input and output. Typically, these computer systems execute either the Microsoft or Linux operating systems.

Initially intended for personal use, these computer systems are being utilized in building communication appliances such as routers, switches, load balancers and network security appliances. These X86 computers are cheap, readily available and are undergoing constant improvement.

However, the computing demands of a communication appliance typically limit the performance of appliances based on these platforms.

Accordingly, what is needed is a system and method for overcoming the above-identified issues. The present invention addresses such a need.

SUMMARY OF THE INVENTION

The present invention provides a cost effective method to improve the performance of communication appliances by retargeting the graphics processing unit as a coprocessor to accelerate networking operations. A system and method is disclosed for using a coprocessor on a standard personal computer to accelerate packet processing operations common to network appliances. The appliances include but are not limited to routers, switches, load balancers and Unified Threat Management systems. More specifically, the method uses common advanced graphics processor engines to accelerate the packet processing tasks.

Game consoles, such as the Xbox 360 from Microsoft, have powerful graphics processing units. Using this invention, these platforms may also be used to build cheap, high performing communication appliances.

DETAILED DESCRIPTION

The present invention relates generally to networking systems and more specifically to packet processing systems that use graphics systems to process packets. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
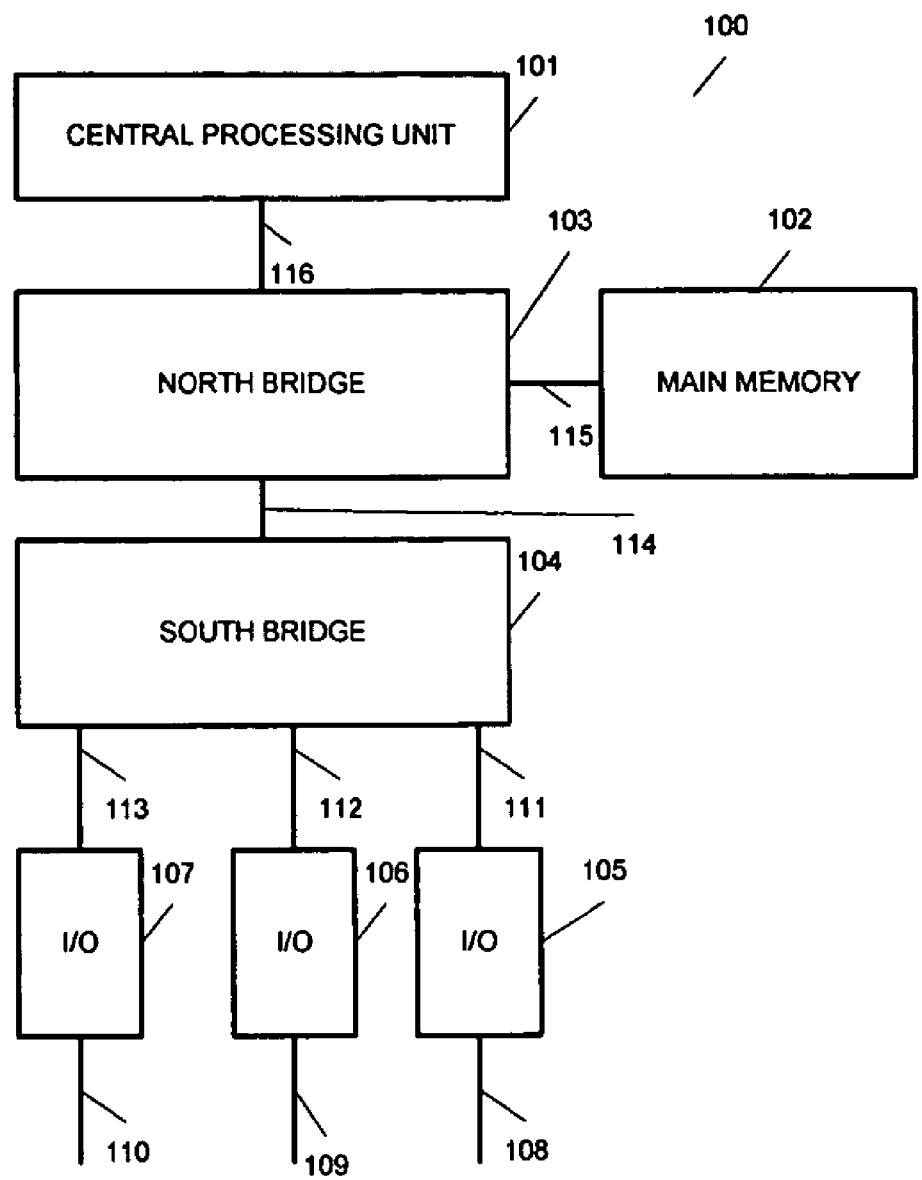
FIG. 1 is a block diagram of a system architecture of currently deployed networking appliances.

FIG. 1 depicts an example architecture of current X86 based communication processing systems. the system 100 includes a plurality of nodes 101-107, including 3 input/output nodes, main memory node 102 and data transfer nodes 108-115. Nodes 101,103 and 104 may be combined into a single node in certain embodiments. All nodes are interconnected via high speed buses 108-116. High speed buses 108-110 interface to external systems via standard protocols such as ethernet or wireless protocol 802.x.

In the illustrated embodiment system 100, data packets from external sources are transferred over high speed buses 108-110 into the input/output nodes 105-107. Data packets may range in size from 4 bytes to many hundreds of millions of bytes long. The input/output nodes pre-process the packets and transfer them to main memory node 102 via node 103 and 104 and high speed buses 111-116. The central processing unit 101 transfers the packet data from main memory node 102 via node 103 and high speed buses 115 and 116 into its internal processing circuits. The central processing unit executes software programs to process the packets.

Once the packets are processed, central processing unit 101 transfers the packet data into main memory 102 and then schedules the packet for transmission through input/output nodes 105-107 if needed.

The central processing unit 101 and the main memory unit 102 are the main bottlenecks limiting the amount of packet data system 100 processes. The central processing unit 101 is built with limited parallel compute nodes and cannot speed up operations by processing many packets in parallel.

In the embodiment shown in FIG. 1, communication appliances typically do not incorporate a graphics processor. These appliances do not require monitor displays.

Figure 2:
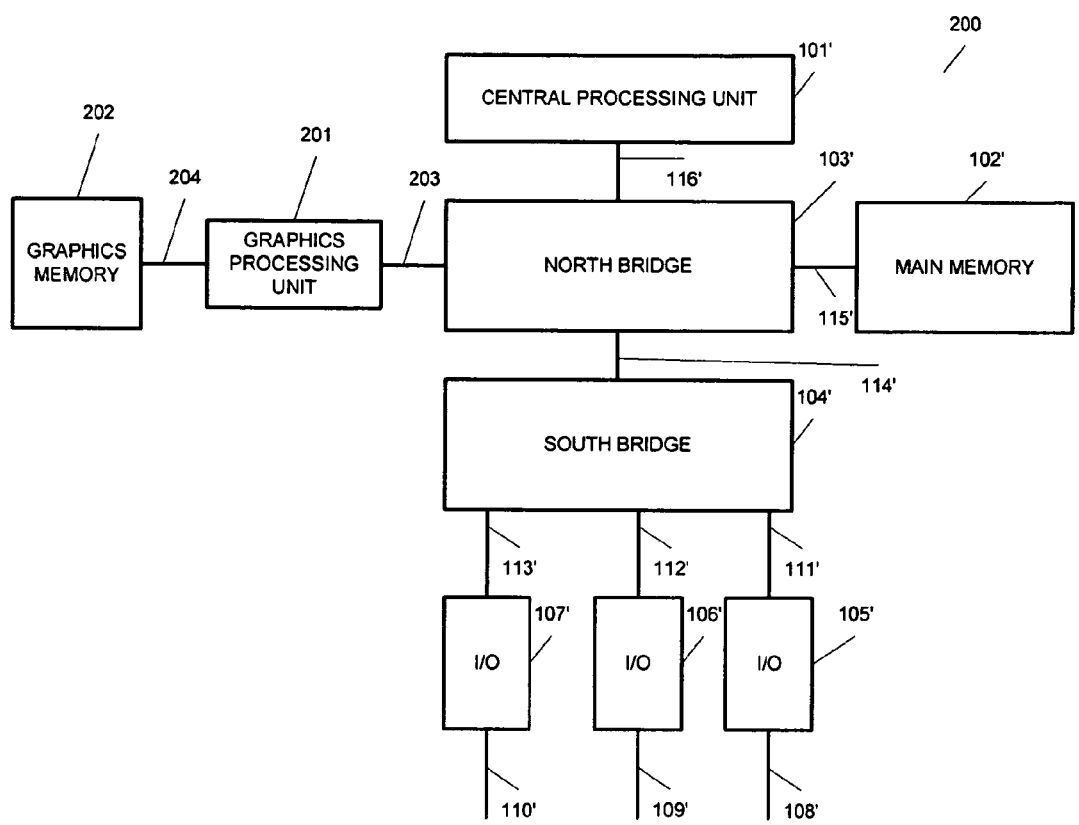
FIG. 2 is a block diagram of system architecture which includes a graphics processor for networking operations.

FIG. 2 illustrates an embodiment of the present invention in which the system 200 incorporates a graphics processor, not primarily for displaying to a monitor but to act as a coprocessor to offload networking operations from the central processing unit 101.

Graphics processors are built to process graphics data such as fonts, windowing systems and 3D games and to display the processed data onto a monitor.

Network processing units such as the Intel IXP 2800 are examples of devices invented and developed to accelerate the processing of packet data. However, these devices are expensive and do not integrate well into an X86 based system.

A system and method in accordance with the present invention retargets the graphics processing unit as a networking processor delivering a cheap, tightly integrated high performance communications system. To describe the features of the present invention in more detail, refer now to the following description in conjunction with the accompanying figures.

In the embodiment illustrated in FIG. 2, system 200 incorporates added nodes 201 and 202 as well as buses 203 and 204. Packet data is transferred through high-speed buses 108-110 to the input/output nodes 105-107. The input/output nodes may transfer the packet data either to main memory 102 via buses 111-115 and nodes 103 and 104 or to graphics memory 202 via buses 111-114 and nodes 203 and 204.

Modern graphics processors such as the Nvidia 7800 contain compute nodes that have been designed to process graphics data. A system and method in accordance with the present invention retargets these compute nodes to do packet processing operations instead of graphics operations.

Figure 3:
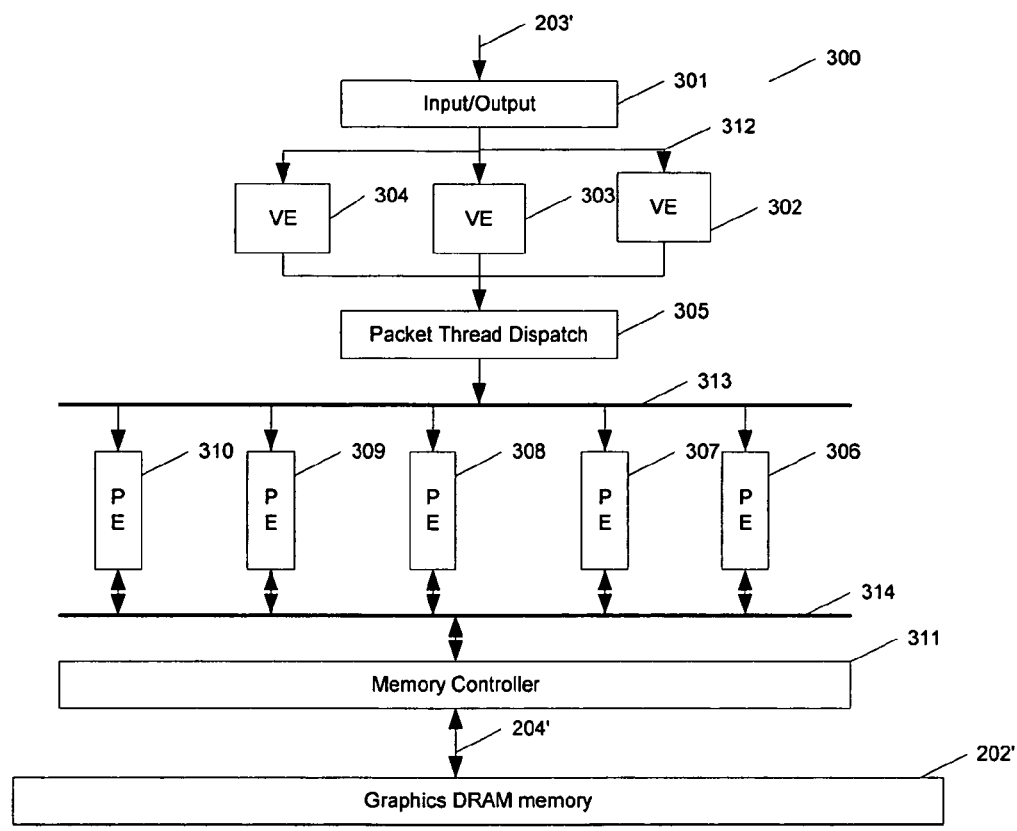
FIG. 3 is a block diagram of example graphics processing unit.

The block diagram in FIG. 3 shows an example architecture of a graphics processing unit. Data and commands to be processed are transferred to/from the central processing unit over high speed bus 203. This bus is commonly called an Advanced Graphics Port (AGP) or PCI-express graphics port. The data and commands are distributed to a plurality of computing nodes 302-310 for processing. These compute nodes are generally referred to as either vertex or shader processors. Graphics processors are much more powerful in processing graphics data than central processing units because of the plurality of computing nodes that are used to process the data in parallel.

The present invention utilizes the plurality of computing nodes to process packet data and networking operations in parallel to greatly improve the performance of the system. The computing nodes are coupled to a high speed memory subsystem through memory control nodes 311 and high speed buses 313-314 and bus 204. This invention uses the high speed memory to store databases for routing, pattern matching and other networking operations.

Figure 4:
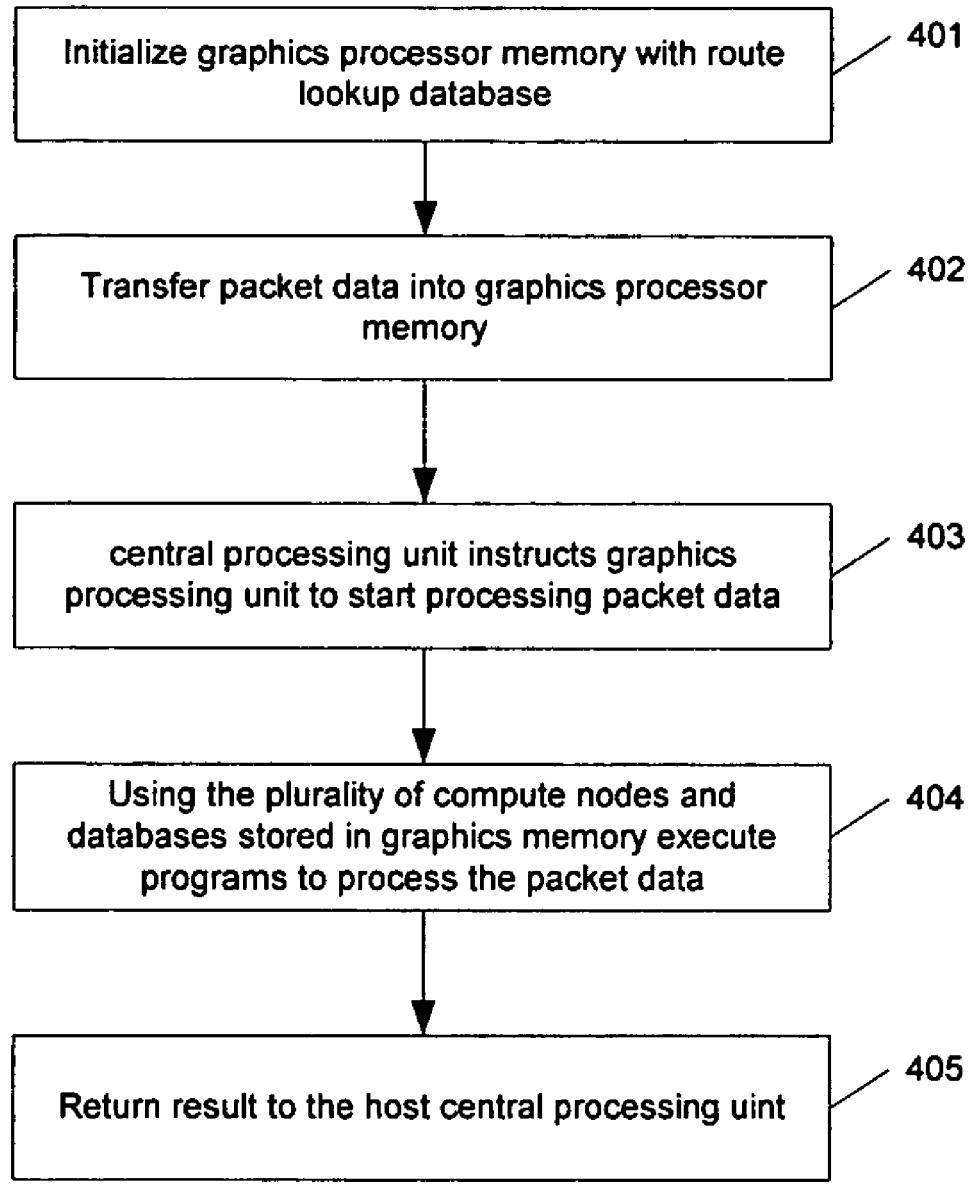
FIG. 4 is a flow chart of operations to process packet data using a graphics processing unit

FIG. 4 illustrates an example flow of operations that are performed to processes the packet data. The graphics memory is initialized with a plurality of databases needed to process the data (block 401). These databases may be updated periodically with new information. Packet data is then streamed into the graphics memory awaiting processing (block 402). The central processing unit then instructs the plurality of nodes to begin processing the packet data (block 403). The compute nodes use the databases stored in graphics memory and the packet data to perform the required processing (block 404). The processed results are then returned to the central processing unit (block 405).

For illustration purposes, the graphics processing node 201 may be programmed to perform a longest prefix match operation. The graphics memory 202 (texture memory or frame buffer memory) is preloaded with a route lookup database. The compute nodes in the graphics processing unit 201 are instructed to execute programs that extract the required fields of data from the packet data and to perform lookups in the database to find the appropriate longest prefix match.

Figure 5:
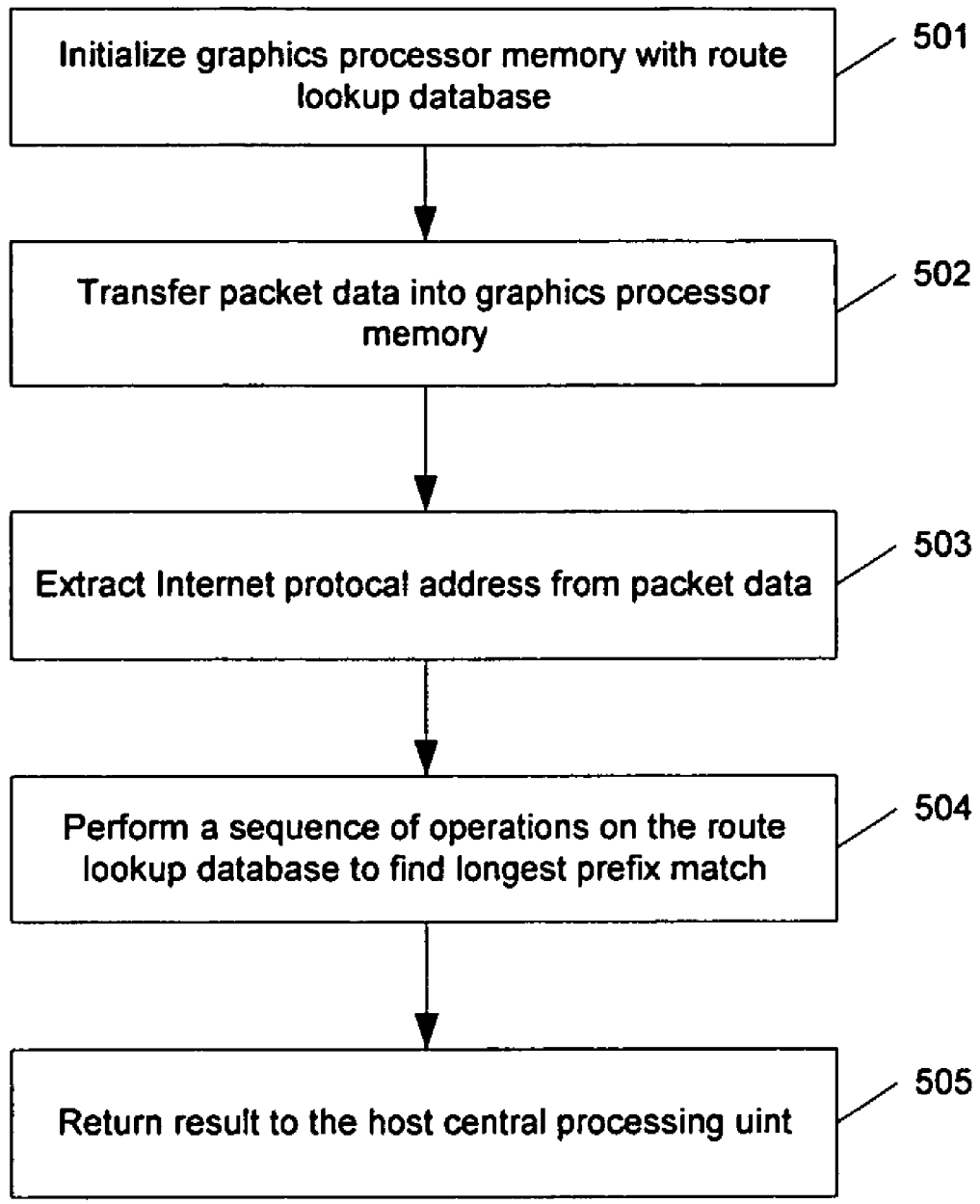
FIG. 5 is a flow chart of an example longest prefix match application using the graphics processing unit

To further illustrate the process, FIG. 5 is a flow chart which illustrates the mapping of longest prefix matching operations onto the graphics processing unit. The graphics processor is initialized with the route lookup database (block 501). This database is typically a tree-like structure that is used to resolve the longest prefix match operation. A plurality of packets are transferred into the graphics processor memory (block 502). These packets are then distributed to a plurality of compute nodes 302-310 for processing. Each compute node will extract either the source or destination internet protocol address from the packet header for the longest prefix match operation (block 503). The internet protocol address is divided into sub-fields. Each sub-field is looked up in the route lookup database (block 504). The processing speed up is obtained by using the plurality of compute nodes in a graphics processor to do the operations in parallel. After each of the packets are processed the results are returned to the central processing unit.

Figure 6:
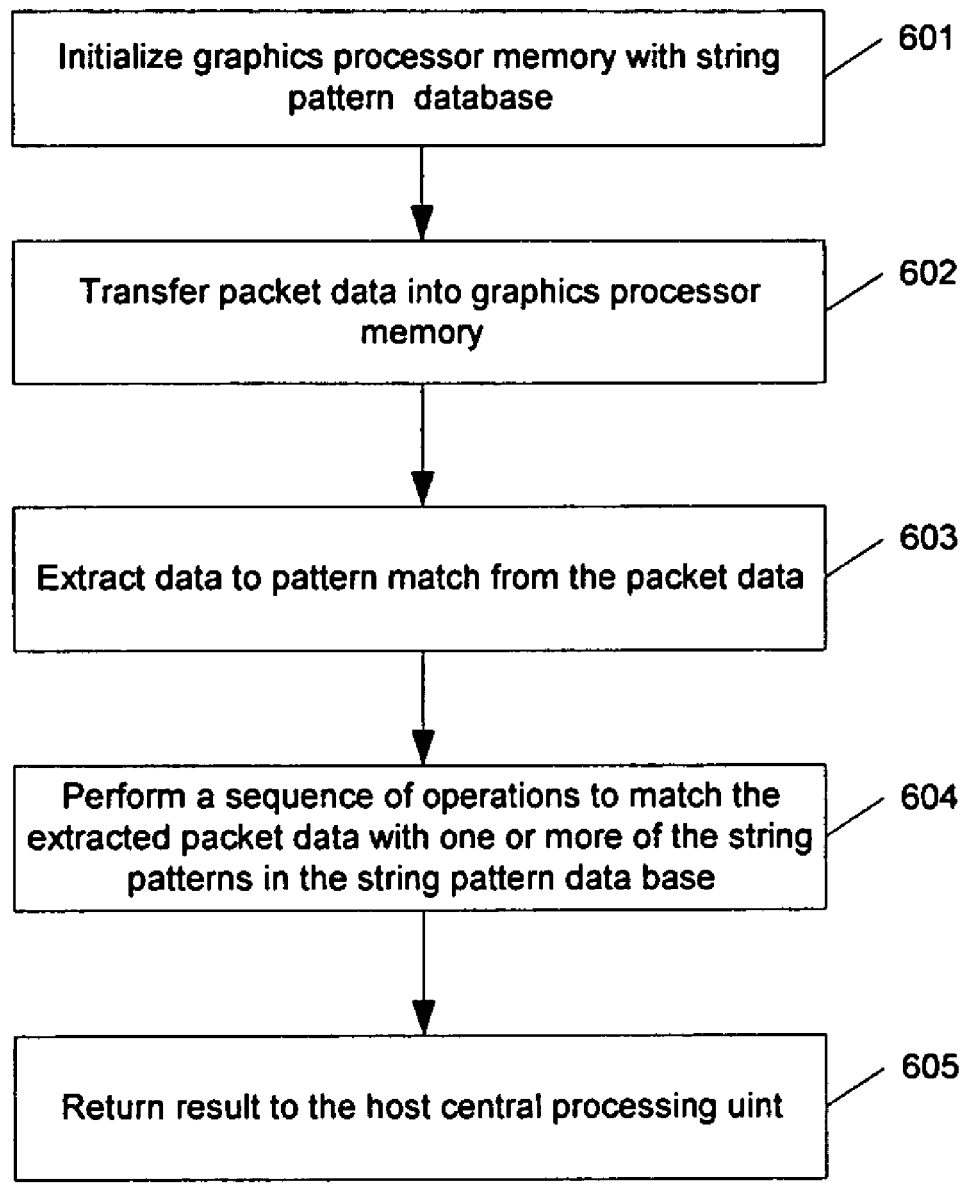
FIG. 6 is a flow chart of an example pattern matching application using the graphics processing unit.

Another important operation that may be accelerated is pattern matching, i.e., finding patterns in the packet data. The patterns may be a database of variable length strings or a collection of regular expression strings. FIG. 6 illustrates a flow chart of operations to do pattern matching on the graphics processing unit. Initially, the graphics memory is loaded with a string pattern database (block 601). This database may be either an exact string matching operation or it may contain the well documented regular expression matching operations. A plurality of packets are transferred over the high speed bus 203 into the memory of the graphic processor (block 602). Programs executing on a plurality of compute nodes 302-310 extract the required data from the packet data stored in graphics memory. These compute nodes then perform in parallel a search through the string database looking for matching patterns (block 4). The result of the operation is returned to the central processing unit 101 via high speed bus 203 (block 5).

A person skilled in the art may program the graphics processing unit 201 to execute different packet processing operations. These operations include, but are not limited to pattern matching, internet protocol lookup, content filtering, virus scanning, spam scanning, malware scanning, XML parsing etc. This is only an illustration and is not intended to limit the scope of the invention. A person skilled in the art may also apply the present invention to processing large volumes of data residing on a hard disk or main memory by partitioning the data into packets and using the mechanisms described.

For example, virus scanning of emails and files is a common but computation expensive operation to perform on the central processing unit. The email and files may be transferred from external systems through input/output nodes 105-107. The emails or files may be stored on a hard disk before processing. In an illustrated embodiment, the virus database is loaded into the graphics memory 202. The emails or files are encapsulated into one or more packets and are transferred via high speed bus 203 and 204 into the graphics memory 202. Parallel pattern matching programs executing on the plurality of compute nodes 302-310 search the data in the emails or files and virus database for patterns that indicate the presence of a virus.

Application based forwarding is another example that will benefit from this invention. In this case, the plurality of compute nodes are used to parse one or more packets to determine how to further process and subsequently forward the packets to their next destination.

In summary, a method and system in accordance with the present invention describes how existing graphics processing unit 201 is utilized to accelerate packet processing operations. In addition, the method and system shows how existing graphics processing engines may be utilized to accelerate packet processing tasks. A general technique and examples are provide to illustrate some of the embodiments of the invention. These examples serve as an illustration of how such tasks are offloaded to the graphics processing engine. It is clear that one of ordinary skill in the art would be able to use this system and method to accelerate other networking operations.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method within a processing system to utilize a graphics processing unit (GPU) as a coprocessor for a central processing unit (CPU), the method comprising:

instructing initialization of an operations database in a memory of the GPU;

offloading operations from the CPU to the GPU, wherein the GPU is initialized with a route lookup database, wherein the route lookup database is used to resolve a longest prefix match operation; wherein the CPU transfers a plurality of network packets into the GPU memory;

sending an instruction from the CPU to the GPU to begin processing data from the plurality of network packets on a plurality of processing nodes of the GPU using the operations database, wherein each node will extract either a source or a destination internet protocol address from a packet header for the longest prefix match operation; and receiving results by the CPU of the processing.

2. The method of claim 1 wherein the CPU and GPU are communicatively coupled through one or more high speed data buses.

3. The method of claim 1 wherein the operations comprise at least one of routing, or application-based forwarding.

4. The method of claim 1 wherein the processing system comprises an X86 computer platform within a communication appliance, wherein the communication appliance does not require a graphical display monitor for operation.

5. The method of claim 1 wherein the GPU is utilized for scanning static files.

6. The method of claim 1 wherein the GPU is utilized to protect against releasing files containing patterns for viruses, specific words and phrases.

7. The method of claim 1 wherein the GPU is utilized to protect against releasing emails containing specific patterns.

8. The method of claim 1 wherein the GPU acts as a coprocessor to offload networking operations.

* * * * *